United States Patent
Zhou et al.

(10) Patent No.: US 12,240,762 B2
(45) Date of Patent: Mar. 4, 2025

(54) MATERIAL WITH CROSS-LINKED SAMARIUM OXIDE/GRAPHENE/SULFUR GEL STRUCTURE, AND PREPARATION METHOD AND USE THEREOF

(71) Applicant: QILU UNIVERSITY OF TECHNOLOGY, Shandong (CN)

(72) Inventors: Guowei Zhou, Jinan (CN); Shaonan Gu, Jinan (CN); Bingjie Liu, Jinan (CN); Yinan Wang, Jinan (CN); Xiaoyi Song, Jinan (CN); Tingting Hu, Jinan (CN); Pei Cao, Jinan (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 725 days.

(21) Appl. No.: 17/608,653

(22) PCT Filed: Aug. 17, 2020

(86) PCT No.: PCT/CN2020/109621
§ 371 (c)(1),
(2) Date: Nov. 3, 2021

(87) PCT Pub. No.: WO2021/047354
PCT Pub. Date: Mar. 18, 2021

(65) Prior Publication Data
US 2022/0250916 A1    Aug. 11, 2022

(30) Foreign Application Priority Data

Sep. 12, 2019 (CN) .......................... 201910865750.8

(51) Int. Cl.
C01B 32/194    (2017.01)
H01M 4/485    (2010.01)
(Continued)

(52) U.S. Cl.
CPC .......... C01B 32/194 (2017.08); H01M 4/485 (2013.01); H01M 4/625 (2013.01);
(Continued)

(58) Field of Classification Search
CPC .. C01B 32/194; C01B 2204/22; H01M 4/485; H01M 4/625; H01M 10/052;
(Continued)

(56) References Cited

FOREIGN PATENT DOCUMENTS

CN    103066292 A  *  4/2013  ............ H01M 4/583
CN    103390752 A     11/2013
(Continued)

OTHER PUBLICATIONS

Dezfuli, et al., Anchoring samarium oxide nanoparitcles on reduced graphene oxide for high-performance supercapacitor, Applied Surface Science 2017; 402: 245-253 (Year: 2017).*
(Continued)

*Primary Examiner* — Daniel C. McCracken
(74) *Attorney, Agent, or Firm* — Oliff PLC

(57) ABSTRACT

A material with pine-branch like samarium oxide/graphene/sulfur gel structure, and a preparation method and use thereof. The material is reduced graphene oxide carrying pine-branch like samarium oxide on the surface to form a cross-linked gel structure, and sulfur is loaded on the gel structure. The preparation method includes: subjecting graphene oxide and a samarium salt to hydrothermal reduction to prepare a reduced graphene oxide/samarium precursor; under an inert atmosphere, thermolysing the reduced graphene oxide/samarium precursor to obtain a reduced graphene oxide/pine-branch like samarium oxide gel; and melting and diffusing the sulfur onto the reduced graphene oxide/pine-branch like samarium oxide gel. The material with pine-branch like samarium oxide/graphene/sulfur gel
(Continued)

structure greatly improves the electrochemical performance of lithium-sulfur batteries.

8 Claims, 3 Drawing Sheets

(51) Int. Cl.
*H01M 4/62* (2006.01)
*H01M 10/052* (2010.01)

(52) U.S. Cl.
CPC ....... H01M 10/052 (2013.01); *C01B 2204/22* (2013.01); *C01P 2004/03* (2013.01); *C01P 2004/80* (2013.01); *C01P 2006/40* (2013.01)

(58) Field of Classification Search
CPC .......... H01M 2004/028; H01M 4/136; H01M 4/1397; H01M 4/36; H01M 4/362; H01M 4/366; H01M 4/38; H01M 4/5815; H01M 4/62; C01P 2004/03; C01P 2004/80; C01P 2006/40; C01P 2002/72; C01P 2002/88; Y02E 60/10
See application file for complete search history.

(56) References Cited

FOREIGN PATENT DOCUMENTS

| CN | 104900884 A | * | 9/2015 | ............. H01M 4/66 |
|---|---|---|---|---|
| CN | 107732203 A | | 2/2018 | |
| CN | 107742707 A | | 2/2018 | |
| CN | 108039460 A | | 5/2018 | |
| CN | 108878879 A | | 11/2018 | |
| CN | 109148861 A | | 1/2019 | |
| CN | 109821527 A | | 5/2019 | |
| CN | 109950479 A | | 6/2019 | |
| CN | 110723727 A | | 1/2020 | |

OTHER PUBLICATIONS

Sheng, et al., A Samarium-Doped Carbon Aerogel Cathode with Anchored Polysulfides for Lithium-Sulfur Batteries with High Electrochemical Performance: A Metal-Organic Framework Template Method, ChemPlusChem 2019; 84: 383-844 (Year: 2019).*
Written Opinion of the International Searching Authority in PCT/CN2020/109621 (Year: 2022).*
Ding, Zhongqiang; "Preparation of cathode of sulfur/carbon aerogel with samarium yttrium and its electrochemical performance for lithium sulfur batteries;" Full Text Database of Chinese Excellent Master's Dissertation, Engineering Technology I; 2019.
Yang et al.; "High-performance lithium-sulfur batteries fabricated from a three-dimensional porous reduced graphene oxide/La2O3 microboards/sulfur aerogel;" Ceramics International; 2019; pp. 9017-9024; vol. 45, No. 7.
Nov. 25, 2020 Office Action issued in Chinese Patent Application No. 201910865750.8.
Nov. 12, 2020 Search Report issued in International Patent Application No. PCT/CN2020/109621.
Nov. 12, 2020 Written Opinion of the International Searching Authority issued in International Patent Application No. PCT/CN2020/109621.

* cited by examiner

MATERIAL WITH CROSS-LINKED SAMARIUM OXIDE/GRAPHENE/SULFUR GEL STRUCTURE, AND PREPARATION METHOD AND USE THEREOF

TECHNICAL FIELD

The present invention relates to nano-material technologies, and particularly to a material with pine-branch like samarium oxide/graphene/sulfur gel structure, and a preparation method and use thereof, which belongs to the technical field of lithium-sulfur batteries.

BACKGROUND

The description herein merely provides background information related to the present invention, and does not necessarily constitute the existing technology.

In recent years, with the rapid development of science and technology, particularly, the constant upgradation of consumer electronics and the rapid rising of new energy vehicles, the requirements for battery performance are getting higher and higher. Due to limited energy density (about 420 W·h/kg), traditional lithium-ion batteries are becoming more and more difficult to meet the increasingly high energy storage demand required by new energy vehicles, aerospace industry and various high-tech electronic products. Therefore, the development of the next generation of new lithium battery systems with high energy density, long cycle life, high rate performance, safety, environmental friendliness, and low cost is extremely urgent.

Lithium-sulfur battery is a new type of lithium battery system that uses sulfur as the cathode active material of the battery, has a theoretical capacity (1675 mA·h/g) and energy density (2600 W·h/kg) that are far greater than lithium-ion batteries, and has the characteristics of low price and environmental friendliness, since sulfur is abundant in the earth. These make the lithium-sulfur battery extremely attractive. However, the defects of sulfur cathode in the lithium-sulfur battery have always restricted its performance. These defects are mainly as follows. i) Sulfur and its discharge products $Li_2S_2$ and $Li_2S$ are insulators and cause a volume expansion of about 80% that can cause the active material to fall off in the process of charge and discharge. This not only hinders the rate of charge transfer, but also makes the sulfur unable to be fully utilized. ii) The long-chain lithium polysulfides, intermediate products in the charge-discharge reaction process, has a high solubility in the electrolyte solution. The dissolved lithium polysulfides diffuse to the anode as driven by the concentration gradient, to form a solid product deposited on the surface of the anode, causing the "shuttle effect", and the rapid decline of the battery capacity.

To overcome the main shortcomings of the sulfur cathode, researchers focus on the design and synthesis of cathode materials for lithium-sulfur batteries in the following two aspects. (1) Sulfur is combined with a conductive medium to enhance the conductivity of the cathode. The cathode material of lithium-sulfur batteries is improved from the perspective of electron and proton transfer, to improve the performance of lithium-sulfur batteries. (2) While the conductivity is improved, a polar compound such as an oxide and a sulfide is loaded in the cathode sulfur composite to increase the absorption and confinement of lithium polysulfides by the cathode support material during the reaction process of the battery. The performance of lithium-sulfur batteries is improved from the perspective of inhibiting the "shuttle effect" of lithium polysulfides. For example, the Chinese Patent Application Publication No. CN108878879A (2017103189790) discloses a method for preparing a lithium-sulfur battery cathode by perforating and reducing graphene oxide into a self-supporting material. In this patent, graphene oxide is reduced by a hydrothermal method and undergoes self-assembly, and then nano-scale mesopores and micropores are formed on the graphene surface by perforating with hydrogen peroxide, to obtain perforated and reduced graphene oxide as a self-supporting material. However, the inventor of the present invention finds that, due to the non-polarity of the carbon matrix, adsorption and confinement for lithium polysulfides is very limited. Chinese Patent Application Publication No. CN108039460A (201711170934X) discloses a three-dimensional nitrogen-doped graphene nanotube and a preparation method thereof. One-dimensional nickel nanorods are prepared with a soluble nickel salt, a water-soluble polymer soft template and hydrazine hydrate by a hydrothermal method. Then graphene nanotubes coating the one-dimensional nickel nanorods are prepared by chemical vapor deposition. Then, the graphene nanotubes are immersed in an inorganic salt precursor solution, to obtain graphene nanotubes coated with the inorganic salt precursor. Next, the coated graphene nanotubes are heat to promote the decomposition of the inorganic salt precursor coating. Nitrogen-doped carbon nanotubes are grown outside the graphene tube, to obtain three-dimensional nitrogen-doped graphene nanotubes. It can be seen that the preparation method of the composite material is complicated, and the steps are troublesome.

Besides, the inventor of the present invention also finds through research that the existing sulfur cathode composite material still has unsatisfactory sulfur loading ability due to the loose nano-particle structure.

SUMMARY

An object of the present invention is to provide a material with pine-branch like samarium oxide/graphene/sulfur gel structure, and a preparation method and use thereof, so as to solve the technical problems of low conductivity, low stability, and poor cycle performance of existing cathode materials for lithium-sulfur batteries, and solve the technical problems of low sulfur load and low cycle life of existing lithium-sulfur batteries.

To achieve the above objects, the following technical solutions are employed in the present invention:

In a first aspect, the present invention provides a material with pine-branch like samarium oxide/graphene/sulfur gel structure, in which reduced graphene oxide carries pine-branch like samarium oxide on the surface to form a cross-linked gel structure, and sulfur is loaded on the gel structure.

The gel in the present invention has a large number of active sites, and can greatly enhance the sulfur load. The net-like cross-linked structure can buffer the volume change of sulfur during the charge and discharge process of the battery. Moreover, the pine-branch like samarium oxide can effectively adsorb the polysulfides, inhibit the dissolution of polysulfides, and promote the reaction of lithium polysulfides, thus greatly improving the electrochemical performance of the lithium-sulfur battery.

In a second aspect, the present invention provides a method for preparing a material with pine-branch like samarium oxide/graphene/sulfur gel structure. The method comprises subjecting graphene oxide and a samarium salt to hydrothermal reduction to prepare a reduced graphene oxide/samarium precursor; under an inert atmosphere, thermolysing the reduced graphene oxide/samarium precursor to obtain a reduced graphene oxide/pine-branch like samarium oxide gel; and melting and diffusing the sulfur onto the reduced graphene oxide/pine-branch like samarium oxide gel, to obtain the material with pine-branch like samarium oxide/graphene/sulfur gel structure.

In the present invention, a reduced graphene oxide gel structure with a large number of active sites is obtained by hydrothermal reduction and thermolysis thereby improving the electrochemical performance of the material. When a nanomaterial is prepared by a traditional hydrothermal method, impurities are usually produced. However, no impurities are produced in the hydrothermal reduction process in the present invention, and the operations are simple, environmental friendly and safe.

In a third aspect, the present invention provides use of the material with pine-branch like samarium oxide/graphene/sulfur gel structure in the preparation of lithium-sulfur batteries. Especially when it is used as a cathode material in a lithium-sulfur battery, the electrochemical performance of the lithium-sulfur battery can be greatly improved.

In a fourth aspect, the present invention provides a battery cathode material, comprising the material with pine-branch like samarium oxide/graphene/sulfur gel structure.

In a fifth aspect, the present invention provides a lithium-sulfur battery, having an anode that is lithium, and a cathode that is the material with pine-branch like samarium oxide/graphene/sulfur gel structure or a battery cathode material.

The present invention has the following beneficial effects.

In the cathode material of pine-branch like samarium oxide/graphene/sulfur gel structure for lithium-sulfur battery prepared in the present invention, the reduced graphene oxide gel structure increases the specific surface area and increases the reaction sites of the active material, thus improving the sulfur load; and the net-like cross-linked structure can buffer the volume change of sulfur during the charge and discharge process of the battery, thereby improving the electrochemical performance of the lithium-sulfur battery. The growth of pine-branch like polar samarium oxide crystal on the surface of graphene by in-situ thermolysis cannot only effectively confine lithium polysulfides, but also promote the reaction of lithium polysulfides. When a lithium sheet is used as an anode, the lithium-sulfur battery is tested and verified to have a specific discharge capacity reaching 1395 mAh g$^{-1}$ when the current is 0.5 C. In the present invention, a sulfur/samarium oxide/graphene oxide cathode material for batteries is obtained by a hydrothermal method. The hydrothermal method is a commonly used method for preparing nanomaterials, during which a small amount or even a large amount of impurities are generally produced. However, no impurities are produced in the steps of the present invention, and the operations are simple, environmental friendly and safe.

In the embodiments of the present invention, a reduced graphene oxide gel structure with a large number of active sites is obtained by in-situ thermolysis of reduced graphene oxide and samarium nitrate hexahydrate, which enhances the sulfur load that is experimentally verified to be as high as 74.8 wt %. Moreover, in the embodiments of the present invention, a graphene gel loaded with pine-branch like samarium oxide is successfully prepared. The pine-branch like samarium oxide can effectively adsorb the polysulfides, inhibit the dissolution of polysulfides, and promote the reaction of lithium polysulfides by the electrons in 4f orbital of Sm, thereby improving the conversion efficiency and greatly improving the electrochemical performance of the lithium-sulfur battery.

BRIEF DESCRIPTION OF THE DRAWINGS

The accompanying drawings of this specification forming a part of the present invention are used to provide further understanding of the present invention, and the exemplary embodiments of the present invention and descriptions thereof are used to explain the present invention but do not constitute an improper limitation on the present invention.

DETAILED DESCRIPTION

Figure 1:
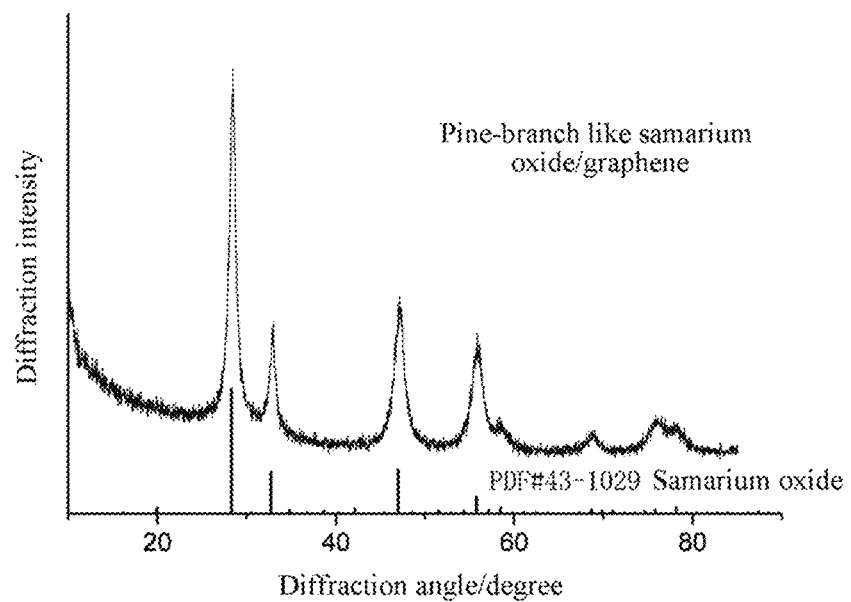
FIG. 1 shows an XRD pattern of the pine-branch like samarium oxide/graphene gel in Example 1 of the present invention.

It should be noted that the following detailed descriptions are all illustrative and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the present invention clearly dictates otherwise. In addition, it should further be understood that, terms "comprise" and/or "include" used in this specification indicate that there are features, steps, operations, components, assemblies, and/or combinations thereof.

In view of the technical problems that existing cathode materials of lithium-sulfur batteries have low conductivity, low stability, and poor cycle performance, and that lithium-sulfur batteries have low sulfur load and low cycle life, the present invention provides a material with pine-branch like samarium oxide/graphene/sulfur gel structure, and a preparation method and use thereof.

In a typical implementation of the present invention, a material with pine-branch like samarium oxide/graphene/sulfur gel structure is provided, in which reduced graphene oxide carries pine-branch like samarium oxide on the surface to form a cross-linked gel structure, and sulfur is loaded on the gel structure.

The gel in the present invention has a large number of active sites, and can greatly enhance the sulfur load. The net-like cross-linked structure can buffer the volume change of sulfur during the charge and discharge process of the battery. Moreover, the pine-branch like samarium oxide can effectively adsorb the polysulfides, inhibit the dissolution of polysulfides, and promote the reaction of lithium polysulfides, thus greatly improving the electrochemical performance of the lithium-sulfur battery.

In one or some embodiments of this implementation, the load of sulfur is 60-74.8 wt %.

In another implementation of the present invention, a method for preparing a material with pine-branch like samarium oxide/graphene/sulfur gel structure is provided. The method comprises subjecting graphene oxide and a samarium salt to hydrothermal reduction to prepare a reduced graphene oxide/samarium precursor; under an inert atmosphere, thermolysing the reduced graphene oxide/samarium precursor to obtain a reduced graphene oxide/pine-branch like samarium oxide gel; and melting and diffusing the sulfur onto the reduced graphene oxide/pine-branch like samarium oxide gel, to obtain the material with pine-branch like samarium oxide/graphene/sulfur gel structure.

In the present invention, a reduced graphene oxide gel structure with a large number of active sites is obtained by hydrothermal reduction and thermolysis thereby improving the electrochemical performance of the material. When a nanomaterial is prepared by a traditional hydrothermal method, impurities are usually produced. However, no impurities are produced in the hydrothermal reduction process in the present invention, and the operations are simple, environmental friendly and safe.

The samarium salt in the present invention refers to a compound with a cation that is a samarium ion, for example, samarium nitrate, samarium chloride, samarium sulfate and so on. When samarium nitrate is used, the effect of the prepared material is much better.

In one or some embodiments of this implementation, the hydrothermal reduction comprises the steps of: mixing a graphene oxide colloidal solution and the samarium salt solution, adjusting the solution to a basic pH with aqueous ammonia, adding hydrazine hydrate, and heating to at least 160° C. and reacting while sealed. Use of the graphene oxide colloidal solution and the samarium salt solution allows graphene oxide and samarium salt to be mixed more evenly, so that the reduced graphene oxide can bind more samarium oxide.

In this series of embodiments, the graphene oxide colloidal solution is prepared by adding water to graphene oxide and ultrasonically treating.

In this series of embodiments, the concentration of the samarium salt solution is 0.8-1.6 mmol $L^{-1}$, the concentration of the samarium salt solution is, for example, 0.8, 1.2, or 1.6 mmol $L^{-1}$.

In this series of embodiments, the concentration of aqueous ammonia is 20-30 wt %.

In this series of embodiments, the pH is adjusted to 10-11.

In order to prevent the production of a large amount of gas and heat caused by too fast addition of hydrazine hydrate to affect the progress of the reaction, in this series of embodiments, hydrazine hydrate is added at a rate of 15~25 μL/min.

In this series of embodiments, the weight ratio of graphene oxide to hydrazine hydrate is 1:1.3-1.4.

In one or some embodiments of this implementation, graphene oxide and the samarium salt are added at a ratio of 40:1-2 mg:μmol.

In one or some embodiments of this implementation, the hydrothermal reduction temperature is 175-185° C.

In one or some embodiments of this implementation, the thermolysis temperature is 440-460° C.

The inert atmosphere described in the present invention is a gas atmosphere provided by, for example, nitrogen, and argon, etc to prevent the oxidation by oxygen. In one or some embodiments of this implementation, the inert atmosphere is argon atmosphere, to provide a better effect.

In one or some embodiments of this implementation, the weight ratio of sulfur to the reduced graphene oxide/pine-branch like samarium oxide gel is 4-5:1.

In one or some embodiments of this implementation, the sulfur is sublimed sulfur. The purity of sublimed sulfur is higher to ensure that more sulfur is loaded.

In one or some embodiments of this implementation, the melting and diffusing comprises, after the sulfur is mixed with graphene oxide/pine-branch like samarium oxide gel uniformly, heating to 110-120° C.; and then heating to 150-160° C.

In order to mix sulfur with graphene oxide/pine-branch like samarium oxide gel more uniformly, in this series of embodiments, sulfur is ground and mixed with graphene oxide/pine-branch like samarium oxide gel.

In this series of embodiments, the treatment time at 110-120° C. is 0.5-1.5 hrs.

In this series of embodiments, the treatment time at 150-160° C. is 10-14 hrs.

In a third implementation of the present invention, use of the material with pine-branch like samarium oxide/graphene/sulfur gel structure in the preparation of lithium-sulfur batteries is provided. Especially when it is used as a cathode material in a lithium-sulfur battery, the electrochemical performance of the lithium-sulfur battery can be greatly improved.

In a fourth implementation of the present invention, a battery cathode material is provided, which comprises the material with pine-branch like samarium oxide/graphene/sulfur gel structure.

In a fifth implementation of the present invention, a lithium-sulfur battery is provided, which has an anode that is lithium, and a cathode that is the material with pine-branch like samarium oxide/graphene/sulfur gel structure or a battery cathode material.

To enable those skilled in the art to more clearly understand the technical solutions of the present invention, the technical solutions of the present invention will be described in detail below in conjunction with specific examples.

Example 1

(1) Preparation of reduced graphene oxide/samarium precursor: 80 mg of graphene oxide was weighed and placed in a 100 mL beaker. Then 40 mL of deionized water was added, and ultrasonicated for 2 hrs. 2.5 mL of 1.6 mmol $L^{-1}$ samarium nitrate aqueous solution was transferred to a 100 mL beaker, and the graphene oxide colloidal solution was slowly added to the samarium nitrate solution dropwise and mixed well by stirring for 2 hrs to obtain a mixture. 25 wt % aqueous ammonia was added dropwise until the pH was 10. Then, 1.3 mL of 85 mg $mL^{-1}$ hydrazine hydrate solution was added dropwise at a rate of 100 microliters every 5 minutes with stirring. The solution was transferred to a reactor and reacted at 180° C. for 6 hrs. The reaction product was cooled naturally, centrifuged, washed, frozen, and freeze drying, to obtain the reduced graphene oxide/samarium precursor gel.

(2) Preparation of pine-branch like samarium oxide/graphene gel: The reduced graphene oxide/samarium precursor gel was placed in a corundum reaction boat, and high-purity argon was filled in a tubular furnace as a protective gas. The system was heated 450° C., and reacted for 3 hrs. After the reaction system was cooled naturally, a pine-branch like samarium oxide/graphene gel was obtained.

(3) Battery cathode material of pine-branch like samarium oxide/graphene/sulfur gel: 10 mg of pine-branch like samarium oxide/graphene gel and 40 mg of sublimed sulfur were mixed, fully ground, transferred to a reactor, heated to 115° C. and reacted for 1 hr, and then further heated to 155° C. and reacted for 12 hrs, to obtain a battery cathode material of pine-branch like samarium oxide/graphene/sulfur gel.

The performance of the prepared battery cathode material of pine-branch like samarium oxide/graphene/sulfur gel was tested. FIG. 1 shows an XRD pattern of the pine-branch like samarium oxide/graphene gel in Example 1. It can be seen from FIG. 1 that after the hydrothermal reaction and the in-situ thermolysis reaction, no other impurity peaks appear. The final sample is samarium oxide/graphene gel.

Figure 2:
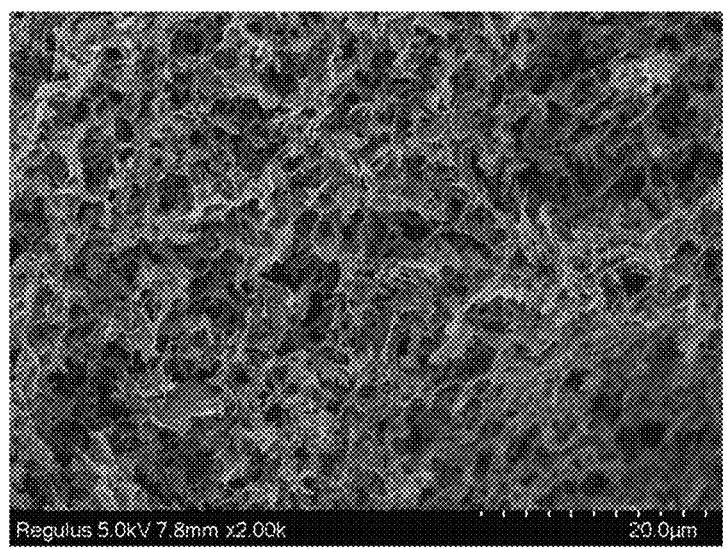
FIG. 2 shows an SEM image of the pine-branch like samarium oxide/graphene/sulfur gel in Example 1 of the present invention.

FIG. 2 shows an SEM image of the pine-branch like samarium oxide/graphene/sulfur gel material in Example 1. It can be seen from FIG. 2 that pine-branch like samarium oxide is formed on the surface of the reduced graphene oxide and a cross-linked gel structure is formed.

Figure 3:
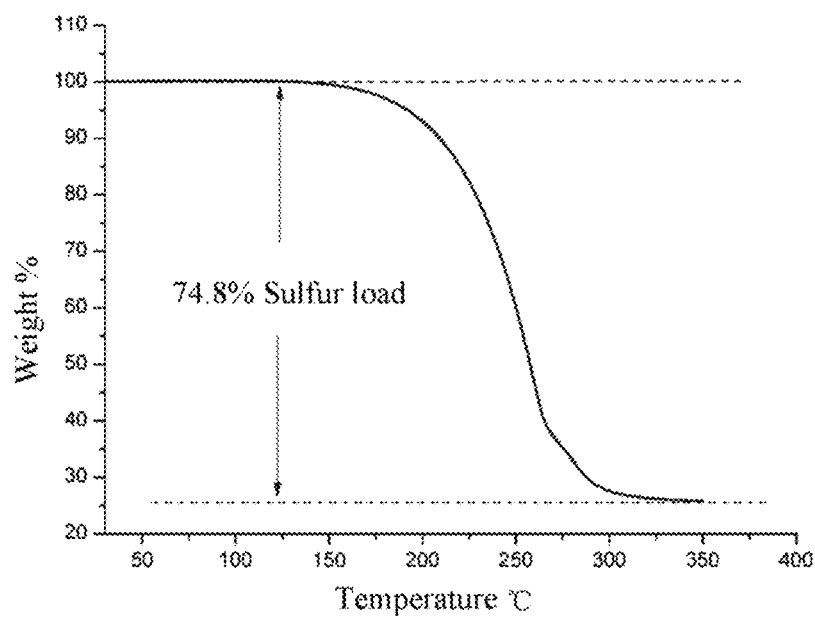
FIG. 3 shows a TGA profile of the pine-branch like samarium oxide/graphene/sulfur gel in Example 1 of the present invention.

FIG. 3 shows a TGA profile of the pine-branch like samarium oxide/graphene/sulfur gel material in Example 1. It can be seen from FIG. 3 that this gel structure can load up to 74.8% sulfur.

Figure 4:
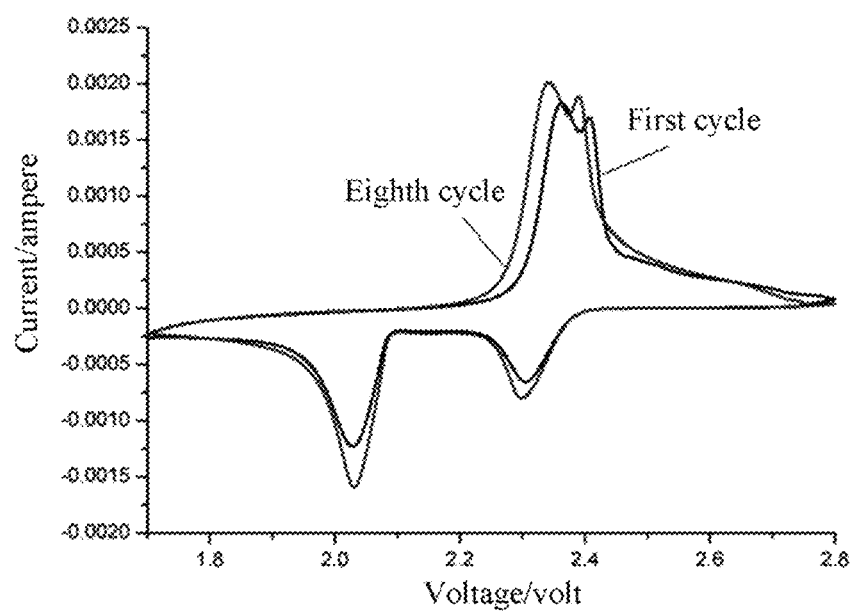
FIG. 4 shows a CV curve of the battery cathode material of pine-branch like samarium oxide/graphene/sulfur gel in Example 1 of the present invention.

FIG. 4 shows a CV curve of the cathode material of pine-branch like samarium oxide/graphene/sulfur gel in Example 1. It can be seen from FIG. 4 that the battery cathode material of pine-branch like samarium oxide/graphene/sulfur gel has good electrochemical performance.

Figure 5:
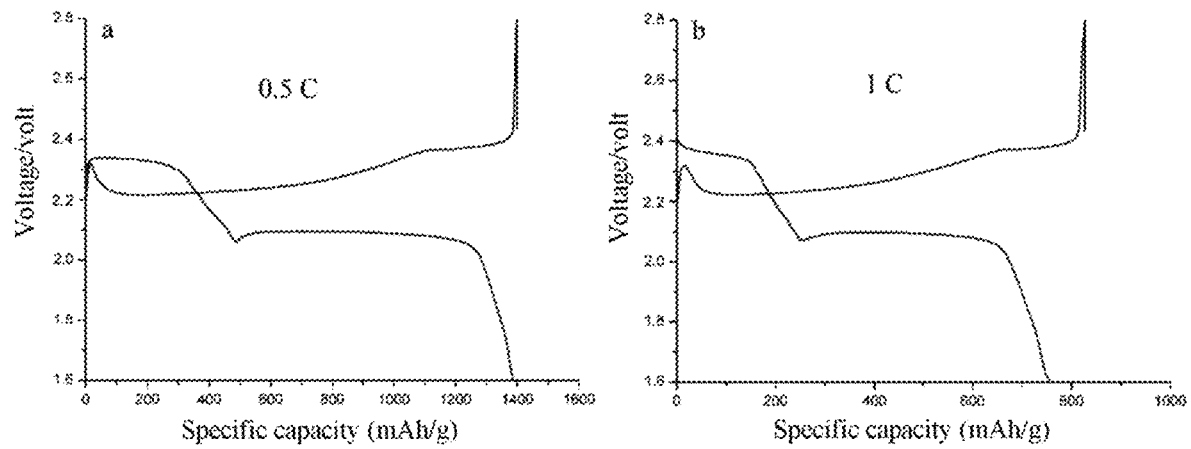
FIG. 5 shows a charge and discharge curve of the battery cathode material in Example 1 of the present invention, in which a is 0.5 C, and b is 1 C.

FIG. 5 shows a charge and discharge curve of the battery cathode material of pine-branch like samarium oxide/graphene/sulfur gel in Example 1. It can be seen from FIG. 5 that the battery cathode material of pine-branch like samarium oxide/graphene/sulfur gel has good charge and discharge performance.

Example 2

(1) Preparation of reduced graphene oxide/samarium precursor: 80 mg of graphene oxide was weighed and placed in a 100 mL beaker. Then 40 mL of deionized water was added, and ultrasonicated for 2 hrs. 2.5 mL of 1.2 mmol $L^{-1}$ samarium nitrate aqueous solution was transferred to a 100 mL beaker, and the graphene oxide colloidal solution was slowly added to the samarium nitrate solution dropwise and mixed well by stirring for 2 hrs to obtain a mixture. 25 wt % aqueous ammonia was added dropwise until the pH was 10. Then, 1.3 mL of 85 mg $mL^{-1}$ hydrazine hydrate solution was added dropwise at a rate of 100 microliters every 5 minutes with stirring. The solution was transferred to a reactor and reacted at 180° C. for 6 hrs. The reaction product was cooled naturally, centrifuged, washed, frozen, and freeze drying, to obtain the reduced graphene oxide/samarium precursor gel.

Steps (2) and (3) are the same as those in Example 1.

Example 3

(1) Preparation of reduced graphene oxide/samarium precursor: 80 mg of graphene oxide was weighed and placed in a 100 mL beaker. Then 40 mL of deionized water was added, and ultrasonicated for 2 hrs. 2.5 mL of 0.8 mmol $L^{-1}$ samarium nitrate aqueous solution was transferred to a 100 mL beaker, and the graphene oxide colloidal solution was slowly added to the samarium nitrate solution dropwise and mixed well by stirring for 2 hrs to obtain a mixture. 25 wt % aqueous ammonia was added dropwise until the pH was 10. Then, 1.3 mL of 85 mg $mL^{-1}$ hydrazine hydrate solution was added dropwise at a rate of 100 microliters every 5 minutes with stirring. The solution was transferred to a reactor and reacted at 180° C. for 6 hrs. The reaction product was cooled naturally, centrifuged, washed, frozen, and freeze drying, to obtain the reduced graphene oxide/samarium precursor gel.

Steps (2) and (3) are the same as those in Example 1.

The CV curve and charge-discharge performance of the lithium-sulfur battery in Examples 2 to 3 are tested to be similar to those of Example 1. All the batteries have good electrochemical performance.

Comparative Example 1

(1) Preparation of reduced graphene oxide: 80 mg of graphene oxide was weighed and placed in a 100 mL beaker. Then 40 mL of deionized water was added, and ultrasonicated for 2 hrs. 25 wt % aqueous ammonia was added dropwise until the pH was 10. Then, 1.3 mL of 85 mg $mL^{-1}$ hydrazine hydrate solution was added dropwise at a rate of 100 microliters every 5 minutes with stirring. The solution was transferred to a reactor and reacted at 180° C. for 6 hrs. The reaction product was cooled naturally, centrifuged, washed, frozen, and freeze drying, to obtain the reduced graphene oxide gel.

(2) Battery cathode material of graphene/sulfur gel: 10 mg of graphene gel and 40 mg of sublimed sulfur were mixed, fully ground, transferred to a reactor, heated to 115° C. and reacted for 1 hr, and then further heated to 155° C. and reacted for 12 hrs, to obtain a battery cathode material of graphene/sulfur gel.

Figure 6:
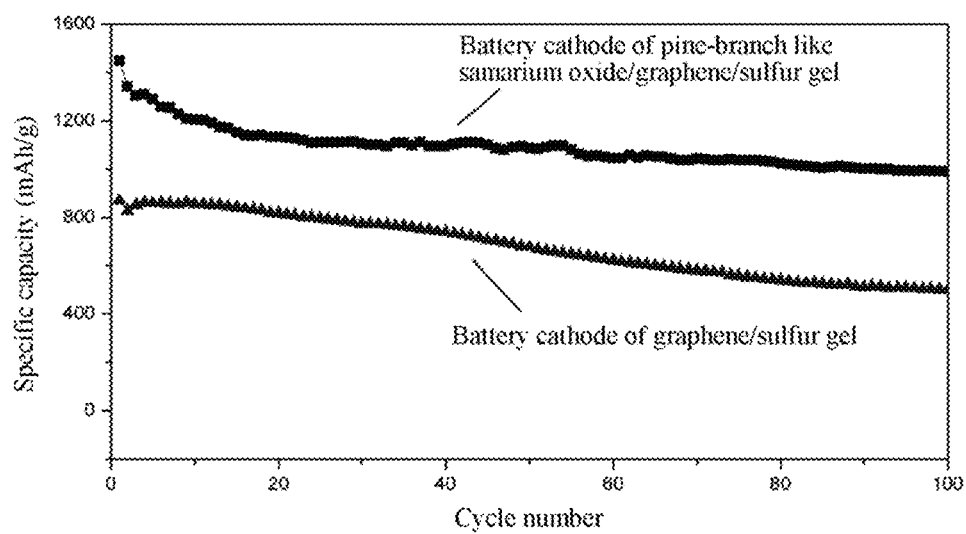
FIG. 6 compares the charge and discharge cycles of the battery cathode of pine-branch like samarium oxide/graphene/sulfur gel in Example 1 of the present invention and the battery cathode of the graphene/sulfur gel in Comparative Example 1, in which the test condition is 0.5 C.

FIG. 6 compares the charge and discharge cycle life of the battery cathode of pine-branch like samarium oxide/graphene/sulfur gel in Example 1 of the present invention and the battery cathode of the graphene/sulfur gel in the comparative example. As shown in FIG. 6, the presence of pine-branch like samarium oxide in the cathode material, can significantly increase the reversible charge and discharge capacity of the lithium-sulfur battery, resulting in a lithium-sulfur battery with better performance.

The foregoing descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A material comprising a cross-linked gel structure formed by samarium oxide attached to a surface of reduced graphene oxide, wherein the cross-linked gel structure is loaded with elemental sulfur.

2. The material according to claim 1, wherein the elemental sulfur has a loading amount of 60-74.8 wt %.

3. A method for preparing the material according to claim 1, comprising
subjecting graphene oxide and a samarium salt to hydrothermal reduction to prepare a reduced graphene oxide/samarium precursor;
under an inert atmosphere, thermolysing the reduced graphene oxide/samarium precursor to obtain a reduced graphene oxide/samarium oxide gel which is a cross-linked gel structure formed by samarium oxide attached to the surface of reduced graphene oxide; and
loading elemental sulfur onto the reduced graphene oxide/samarium oxide gel by melting and diffusing.

4. The method according to claim 3, wherein the hydrothermal reduction comprises:
  mixing a graphene oxide colloidal solution with a samarium salt solution to form a mixed solution, adjusting pH of the mixed solution to a basic with aqueous ammonia,
  adding hydrazine hydrate to form a reaction solution, and
  heating the reaction solution to at least 160° C. for reaction under sealed condition.

5. The method according to claim 3, wherein
  the graphene oxide and the samarium salt are added at a ratio of 40:1-2 mg:μmol;
  a hydrothermal reduction temperature is 175-185° C.;
  a thermolysis temperature is 440-460° C.;
  the inert atmosphere is argon atmosphere;
  a weight ratio of sulfur to the reduced graphene oxide/samarium oxide gel is 4-5:1; and
  the elemental sulfur is sublimed sulfur.

6. The method according to claim 3, wherein the melting and diffusing comprises:
  mixing the elemental sulfur with the reduced graphene/samarium oxide to form a uniform mixture;
  heating the uniform mixture to 110-120° C.; and
  then heating to 150-160° C.

7. A battery cathode material, comprising the material according to claim 1.

8. A lithium-sulfur battery, having an anode that is lithium, and a cathode that is the material according to claim 1.

* * * * *